Sept. 4, 1923.
P. E. LANDBERG
1,467,178
ELECTRICAL RESISTANCE ELEMENT OF ELECTRIC SOLDERING IRONS AND
SIMILAR HEATING APPARATUS
Filed March 20, 1922
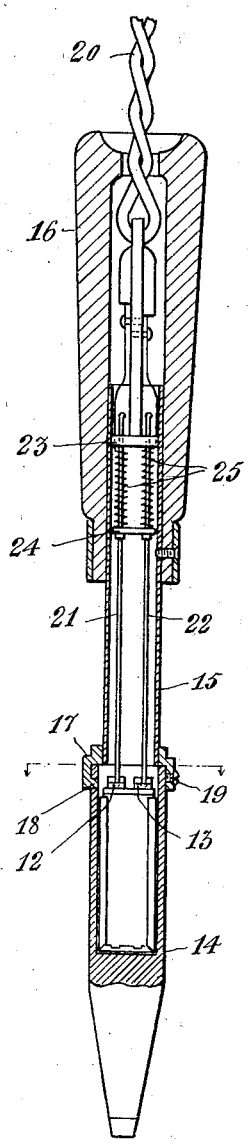
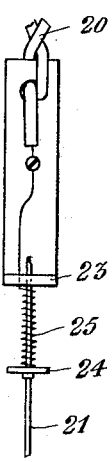
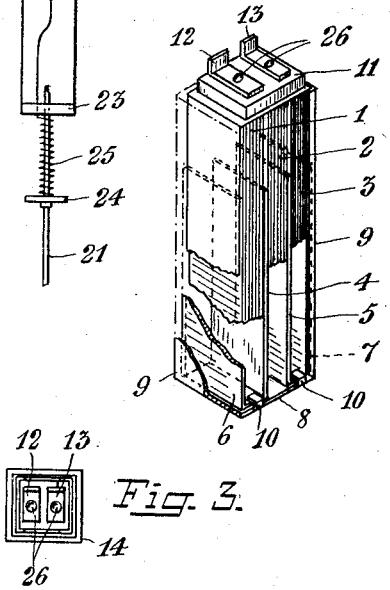
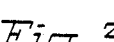
Inventor
P. E. Landberg,
By Marks & Clerk
Attys.

Patented Sept. 4, 1923.

1,467,178

UNITED STATES PATENT OFFICE.

PER ERNST LANDBERG, OF STOCKHOLM, SWEDEN.

ELECTRICAL-RESISTANCE ELEMENT OF ELECTRIC SOLDERING IRONS AND SIMILAR HEATING APPARATUS.

Application filed March 20, 1922. Serial No. 545,175.

*To all whom it may concern:*

Be it known that I, PER ERNST LANDBERG, a subject of the King of Sweden, residing at Stockholm, 26 C Högbergsgatan, Sweden, have invented certain new and useful Improvements in the Electrical-Resistance Elements of Electric Soldering Irons and Similar Heating Apparatus, of which the following is a specification.

In the resistance elements of electric heating apparatus such as electric soldering irons, the windings of the resistance together with the intervening mica washers or the like are generally so arranged that the resistance will be of rather large cross section. Consequently, those windings which are located in the center or near the center of the resistance will have far less possibility to give off their heat than have the more remote and extreme windings, and by reason of this the central windings often become too highly heated so that the resistance is injured.

Now, the present invention has for its main object to prevent this, and to this end it is principally characterized by the resistance member, which preferably is in the form of a package, consisting of parts (resistance windings) connected into the circuit and adapted to produce heat by the flow of current therethrough, as well as of heat-receiving parts arranged between the resistance windings or between groups thereof, the latter parts being in heat-conducting connection with one another as well as with the soldering iron to be heated.

The invention also has for its purpose to produce a soldering iron provided with a resistance of the above description, such soldering iron being constructively as simple as possible and, above all, adapted to be easily dismantled for the insertion of new resistances.

The accompanying drawing illustrates some embodiments of the arrangement of the resistance as well as of the soldering iron proper. Fig. 1 shows a longitudinal section of the soldering iron, and Fig. 2 that part of the iron where the leading-in-wires are connected. Fig. 3 is an endwise view of the resistance, and Fig. 4 is a perspective view of the resistance drawn to a larger scale.

According to Fig. 4, the windings of the resistance are divided in three groups, 1, 2 and 3 respectively, separated by metal disks 4 and 5 inserted therebetween. The disks 4 and 5 form uniform structures with other disks 6 and 7 respectively, in that the disks 4 and 6 are bent from a plate in a U-like fashion, as are also the disks 5 and 7. Both plate structures are attached to the bottom 8 of a metal box 9 surrounding the resistance, by means of tongues 10 stamped from the bottom and bent over the vertexes of the U-shaped plates. The said disks 4—7 together with the adjacent windings of the resistance bear tightly against each other and fit snugly into the metal box 9 which is covered at the top by an insulating cover 11. Attached to the latter are the terminals 12 and 13 which are connected to the windings of the resistance.

The resistance thus arranged forms a solid body, uniform on all sides and fitting tightly into a corresponding cavity in the body of the soldering iron 14. Thus the heat produced in the resistance windings will be uniformly taken up by the metal disks 4—7 throughout the body of the resistance; and is easily given off by the disks to the surrounding metal box 9 which bears tightly against the walls of the hollow in the body of the soldering iron 14.

The shank of the soldering iron consists of a sleeve 15 attached into a wooden handle or the like. Attached to the outer end of the sleeve 15 is a sleeve or flange 17 receiving the open end of the body of the soldering iron 14. In order to provide a secure attachment for the latter, the sleeve 17 is fitted at the edge thereof with one or more inwardly directed hooks 18 entering from the outside into a corresponding opening or openings in the wall of the body of the soldering iron 14. When the latter is inserted into the sleeve 17, it is first set obliquely to the sleeve so that the hooks 18 thereof enter the openings of the body of the soldering iron, after which the body of the iron is brought into alignment with the sleeve 15 of the shaft and is properly introduced into the sleeve 17. Sleeve 17 and the soldering iron are then connected by means of a screw 19.

The last-mentioned arrangement not only provides a secure attachment between the body of the soldering iron and the shank, but also brings about a device of small dimensions and of a regular shape, said device being also easy to dismantle and to assemble.

Arranged within the sleeve 15 of the shaft is a device by means of which the current is conducted from the cord 20 to the terminals 12 and 13 of the resistance. This device consists of two rods 21 and 22 adapted to be displaced in an insulating member 23 attached into the handle. Coiled on the rods between the member 23 and an insulating cross piece 24, which is also threaded on the rods, are helical spring 25 forming extensions of the leading-in wires of the cord 20, said springs not only serving as conductors for the current to the rods but also actuating the latter so that they will be displaced outwards toward the body of the soldering iron 14, whereby the rods are securely retained with their ends in contact with the terminals 12 and 13 of the resistance, said terminals being provided with recesses 26 adapted to receive the ends of the rods.

When the resistance is to be inserted into the soldering iron, the screw 19 is loosened and the body of the soldering iron 14 is swung to the side so that the hook 18 releases its hold. The resistance may then be removed by turning the body of the soldering iron upside down. Another resistance is inserted by slipping or pushing it down into the hollow of the body of the iron. The body of the soldering iron is then hooked onto the flange 17 and attached by means of the screw 19, and the conducting rods 21 and 22 enter the recesses 26 in the terminal pieces 12 and 13 of the resistance, the soldering iron being then again ready for use.

A very great advantage is involved in the feature of the resistance being located within the body of the soldering iron or as near as possible to the part thereof which is to be heated, whereby the heat produced by the current is transmitted to the point of the soldering iron in the most efficient way and in quantities as large as possible, without it being wasted by useless conduction.

What I claim as new and desire to secure by Letters Patent of the United States is:—

1. A heating element of the character described including a casing having open sides for insertion in an article to be heated and conductively connected to the article, heat conducting parts of sheet metal having spaced side portions arranged within and conductively connected with the inner surface of the end portions of the casing and a plurality of resilient wheels arranged between the heat conducting parts and the side portions thereof.

2. A heating element as claimed in claim 1 wherein the heat conducting parts are formed of sheet metal of U-shaped configuration and have their medial portions in conductive relation with the bottom of the casing.

3. A heating element as claimed in claim 1 wherein the casing is formed of sheet metal and is also substantially of U-shaped construction and bendable tongues projecting from the bottom of the U-shaped frame for engaging and holding the heat conducting parts in upright positions in the frame.

4. A soldering iron of the character described including a body portion provided with a recess at the inner end, a resistance element insertable in the recess, contacts on the resistance element, a handle sleeve secured to and projecting from the handle, an offset collar carried by the outer end of the surface and embracing the inner end of the body portion, means for clamping the collar to the body portion, an insulating member within the handle and contact rods slidably and yieldingly mounted in the insulating member and extending through the sleeve and engaging the contact points on the resistance element.

5. A soldering iron as claimed in claim 4 wherein the means provided for clamping the collar to the body portion includes a hook on the collar for engaging the body portion and a screw mounted in the collar opposite the hook for frictionally engaging the body portion.

6. A soldering arm as claimed in claim 4 wherein an insulating cross-piece is connected with the rods within the sleeve and wherein helical springs forming extensions of the leading in wires are arranged about the rods between the insulating member and the cross-piece, substantially as and for the purposes set forth.

In testimony whereof I affix my signature in presence of two witnesses.

PER ERNST LANDBERG.

Witnesses:
 ERIC HOLGER,
 INEZ LOERORN.